(12) United States Patent
Trivette

(10) Patent No.: US 8,899,868 B2
(45) Date of Patent: Dec. 2, 2014

(54) MITER COUPLING AND METHOD

(76) Inventor: Roger Blaine Trivette, Boiling Springs, SC (US)

( * ) Notice: Subject to any disclaimer, the term of this patent is extended or adjusted under 35 U.S.C. 154(b) by 343 days.

(21) Appl. No.: 12/794,994

(22) Filed: Jun. 7, 2010

(65) Prior Publication Data

US 2011/0299922 A1 Dec. 8, 2011

(51) Int. Cl.
- *B25G 3/00* (2006.01)
- *B23K 31/02* (2006.01)
- *B23K 33/00* (2006.01)

(52) U.S. Cl.
CPC .......... *B23K 31/022* (2013.01); *B23K 2201/28* (2013.01); *B23K 33/006* (2013.01)
USPC .............................. 403/231; 403/271; 403/401

(58) Field of Classification Search
USPC ......... 403/401, 205, 403, 382, 218, 270–272; 296/205
See application file for complete search history.

(56) References Cited

U.S. PATENT DOCUMENTS

| | | | | |
|---|---|---|---|---|
| 1,016,278 A | * | 2/1912 | Kuntz | 403/402 |
| 1,512,569 A | * | 10/1924 | Anderson | 403/231 |
| 1,524,261 A | * | 1/1925 | Kusterle | 285/179 |
| 1,694,656 A | * | 12/1928 | Huetten | 403/218 |
| 1,844,498 A | * | 2/1932 | Candy | 403/217 |
| 1,984,172 A | * | 12/1934 | Brownley | 285/179 |
| 2,071,809 A | * | 2/1937 | Anderson | 403/172 |
| 2,203,987 A | * | 6/1940 | Galante | 403/402 |
| 2,255,151 A | * | 9/1941 | Clements | 403/266 |
| 2,366,698 A | * | 1/1945 | Cole | 52/514 |
| 2,546,187 A | * | 3/1951 | Harward | 160/353 |
| 2,742,690 A | * | 4/1956 | Kunkel | 29/417 |
| 3,034,612 A | * | 5/1962 | Jourdan | 403/382 |
| 3,183,560 A | * | 5/1965 | Brichard | 428/34 |
| 3,429,602 A | * | 2/1969 | Dirilgen | 403/295 |
| 3,467,423 A | * | 9/1969 | Schlegel, Jr. et al. | 403/270 |
| 3,531,147 A | * | 9/1970 | Johnson | 403/231 |
| 3,782,054 A | * | 1/1974 | Goss, Jr. | 403/295 |
| 3,786,612 A | * | 1/1974 | Baker | 403/295 |
| 3,859,767 A | * | 1/1975 | Aspenwall | 52/280 |
| 3,914,062 A | * | 10/1975 | Heininger | 403/231 |
| 3,915,328 A | * | 10/1975 | Hawes et al. | 220/592.06 |
| 3,994,112 A | * | 11/1976 | Wallace | 52/846 |
| 4,055,910 A | * | 11/1977 | Schmidt | 40/784 |
| 4,076,432 A | * | 2/1978 | Glaser | 403/176 |
| 4,136,985 A | * | 1/1979 | Taul | 403/172 |
| 4,222,209 A | * | 9/1980 | Peterson | 52/172 |
| 4,230,361 A | * | 10/1980 | Nachbur et al. | 296/30 |
| 4,315,386 A | * | 2/1982 | Clarke | 52/93.1 |
| 4,406,562 A | * | 9/1983 | Nasi | 403/347 |
| 4,698,863 A | * | 10/1987 | Mis | 5/200.1 |
| 5,010,709 A | * | 4/1991 | Paz | 52/658 |
| 5,059,056 A | * | 10/1991 | Banthia et al. | 403/170 |
| 5,100,255 A | * | 3/1992 | Rule et al. | 403/205 |

(Continued)

*Primary Examiner* — Michael P Ferguson
*Assistant Examiner* — Daniel Wiley
(74) *Attorney, Agent, or Firm* — Southeast IP Group, LLC.; Thomas L. Moses

(57) ABSTRACT

A miter coupling and method for using the miter coupling to join a pair of square metal tubes at a desired angle using a welding process. The miter coupling, in a preferred embodiment, comprises a single piece of metal formed into a shape that is adapted to receive the ends of two square metal tubes at a desired angle. The miter coupling is shaped to form a pair of parallel elbow members, where the elbow members are formed into a desired angle, and the elbow members are interconnected by a cross support.

2 Claims, 8 Drawing Sheets

(56) References Cited

U.S. PATENT DOCUMENTS

| | | | |
|---|---|---|---|
| 5,113,538 A * | 5/1992 | Branch, III | 5/127 |
| 5,152,594 A * | 10/1992 | Ashley | 312/270.1 |
| 5,190,207 A * | 3/1993 | Peck et al. | 228/170 |
| 5,320,403 A * | 6/1994 | Kazyak | 296/203.01 |
| 5,338,080 A * | 8/1994 | Janotik et al. | 296/29 |
| 5,435,110 A * | 7/1995 | Stol et al. | 52/655.1 |
| 5,441,241 A * | 8/1995 | McKim | 256/65.1 |
| 5,927,893 A * | 7/1999 | Imamura et al. | 403/270 |
| 6,076,725 A * | 6/2000 | Imamura et al. | 228/164 |
| 6,099,194 A * | 8/2000 | Durand | 403/270 |
| 6,279,879 B1 * | 8/2001 | Statz | 256/65.1 |
| 6,390,724 B1 * | 5/2002 | Thoms et al. | 403/402 |
| 6,446,938 B1 * | 9/2002 | Hadfield et al. | 256/65.12 |
| 7,001,097 B2 * | 2/2006 | Wang et al. | 403/231 |
| 7,185,933 B2 * | 3/2007 | Goransson | 296/30 |
| 7,223,044 B2 * | 5/2007 | Quintile | 403/402 |
| 7,500,802 B2 * | 3/2009 | Patberg | 403/207 |
| 2002/0112439 A1 * | 8/2002 | Rosas | 52/712 |
| 2004/0161296 A1 * | 8/2004 | Goransson | 403/382 |
| 2006/0001285 A1 * | 1/2006 | Patberg | 296/29 |
| 2006/0104710 A1 * | 5/2006 | Lafond | 403/205 |
| 2009/0162138 A1 * | 6/2009 | Burger et al. | 403/271 |
| 2010/0164251 A1 * | 7/2010 | Itou | 296/205 |
| 2010/0187800 A1 * | 7/2010 | Chen et al. | 280/785 |

* cited by examiner

MITER COUPLING AND METHOD

BACKGROUND OF THE INVENTION

The present invention relates generally to techniques and devices for welding or otherwise joining metal support structures together. More specifically, the present invention includes a miter coupling and a method of using such a miter coupling to join together a pair of metal tubes at a desired angle.

Typically, when charged with the task of joining together a pair of metal tubes having a square cross section (square metal tubes), a metal worker must cut an end of each tube to the desired angle, weld the tour sides of the tubes together, and then grind the weld down so that the joint has a smooth outer surface. This procedure, which is used during the production of many types of products, such as supports, frames, scaffolding, and the like, is very labor intensive and results in a joint that has inherently limited strength. Alternatively, when it is necessary to join the square metal tubes to form a 90 degree angle, instead of cutting each tube to form a 45 degree angle and welding the cut edges together, a metal worker may simply weld the open end of one tube to the side of the second tube adjacent the open end thereof. However, this method leaves an open end of the second tube exposed (thus requiring an end cap in many applications), further requires a grinding of the weld, and again results in an inherently weak joint.

Therefore, it would be desirable to provide a device and method for welding together two square metal tubes at a desired angle in a way that would provide for a high strength joint, and would be less labor intensive and less expensive than other methods.

BRIEF SUMMARY OF THE INVENTION

In accordance with one aspect of the invention, a miter coupling is provided, together with a method for using the miter coupling to join a pair of square metal tubes at a desired angle using a welding process. The miter coupling, in a preferred embodiment, comprises a single piece of metal formed into a shape that is adapted to receive the ends of two square metal tubes at a desired angle. The miter coupling is shaped to form a pair of parallel elbow members, where the elbow members are formed into a desired angle, and the elbow members are interconnected by a cross support.

The square metal tubes used in conjunction with the miter coupling have ends that are cut in a transverse, 90 degree direction with respect to the longitudinal direction of the tube. The elbow members of the miter coupling have a first section pointing in a first direction, and a second portion pointing in a second direction. Each elbow section is adapted to receive the end of a square metal tube oriented in the direction specified by that section. In use, the end of a first square metal tube is positioned within the first section of the elbows, and the end of a second square metal tube is positioned within the second section of the elbows. Welds are placed at the distal ends of the elbow sections, in a transverse direction with respect to the longitudinal direction of the square metal tubes. Thus, four welds are generated at the distal ends of the elbows. Additionally, fifth weld may be added to the seam where the square metal tubes contact each other. If necessary for additional strength, other welds may be added.

This device and process allows a pair of square metal tubes to be attached, end to end, at any desired angle in a manner that is less expensive, less time consuming and labor intensive, and which provides a stronger joint.

BRIEF DESCRIPTION OF THE DRAWINGS

These and other features, aspects, and advantages of the present invention will become better understood with regard to the following description, appended claims, and accompanying drawings where:

DETAILED DESCRIPTION OF THE. INVENTION

Figure 1:
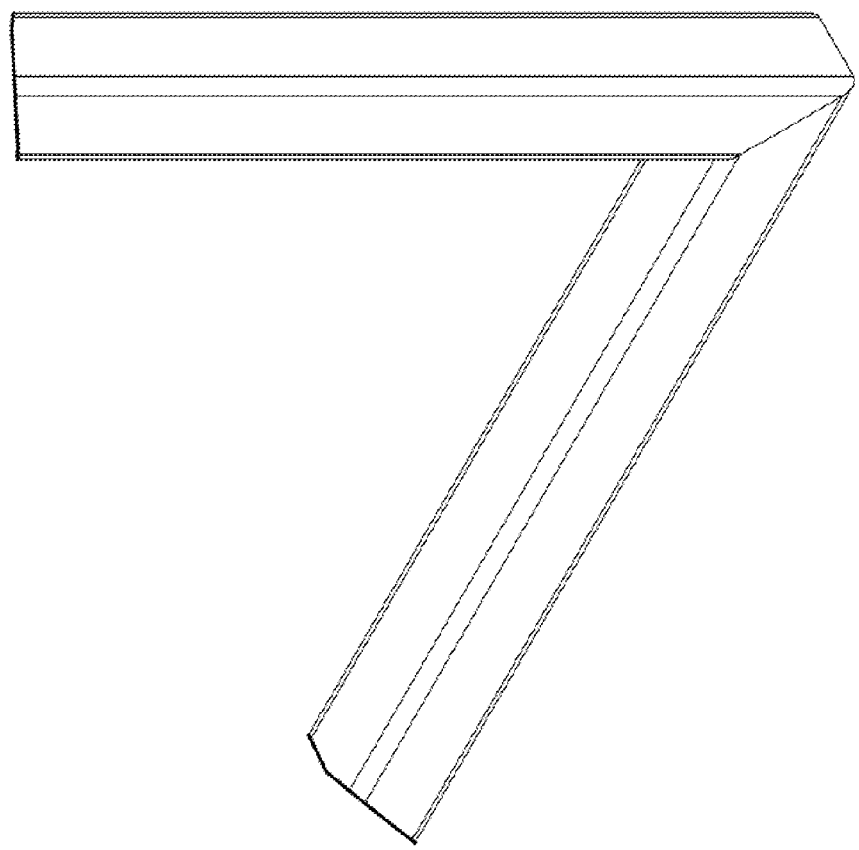
FIG. 1 is a perspective view of a prior art mitered joint between two square metal tubes.
Figure 2:
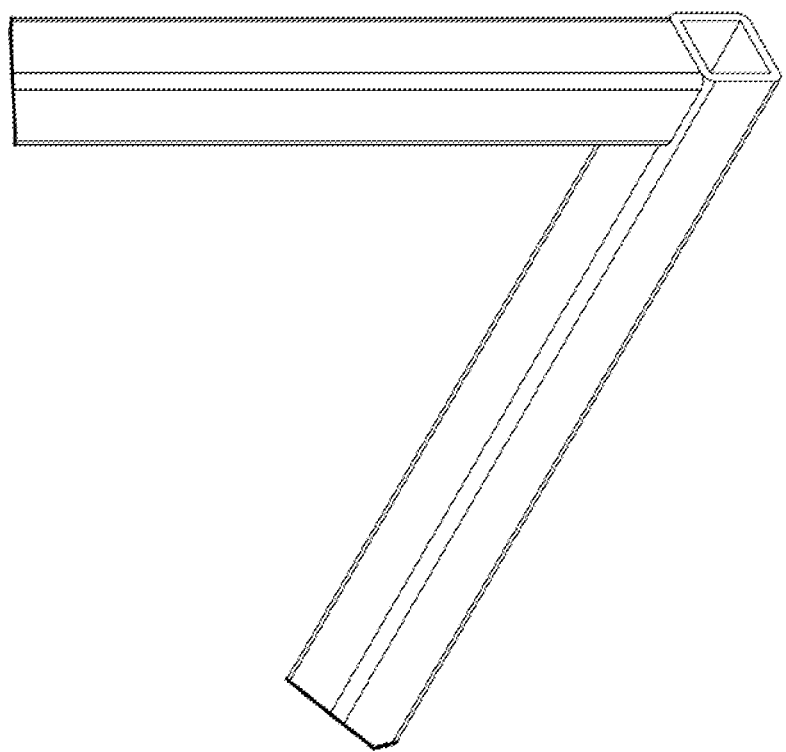
FIG. 2 is a perspective view of a prior art Tee joint between two square metal tubes.

The present invention includes a miter coupling device and method for joining together two square metal tubes at a desired angle. FIGS. 1 and 2 illustrate common methods for joining square metal tubes at a 90 degree angle. FIG. 1 shows two square metal tubes, each having one end cut at a 45 degree angle, wherein the square metal tubes are joined to form a 90 degree angle. In order to join the square metal tubes in accordance with FIG. 1, the tubes are cut at the proper angle, welded around the four seams, and then the welds are ground, down to form a smooth seam. This method is time consuming, labor intensive and expensive. Cutting the tubes to the proper angles consumes valuable time and labor, as does the grinding operation to smooth the welds for a proper finish. Additionally, the strength of the joint produced by this method is limited. FIG. 2 shows an alternate joint and method, wherein the square metal tubes are cut in a transverse direction with respect to the longitudinal direction of the tube, and the end of a first tube is welded to the side of a second tube adjacent an open end of the second tube (a standard T joint). This method also produces a joint having limited strength, and requires that an end cap be inserted into the open end of the second tube.

Figure 3:
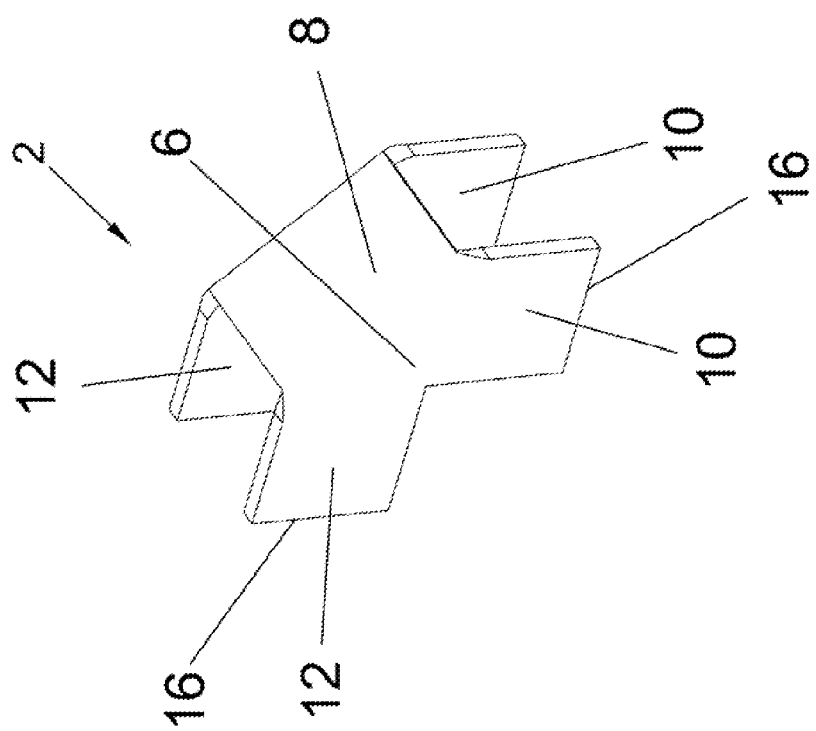
FIG. 3 is a top view of one embodiment of a miter coupling in a flat plane, prior to being formed into a three dimensional shape.
Figure 4:
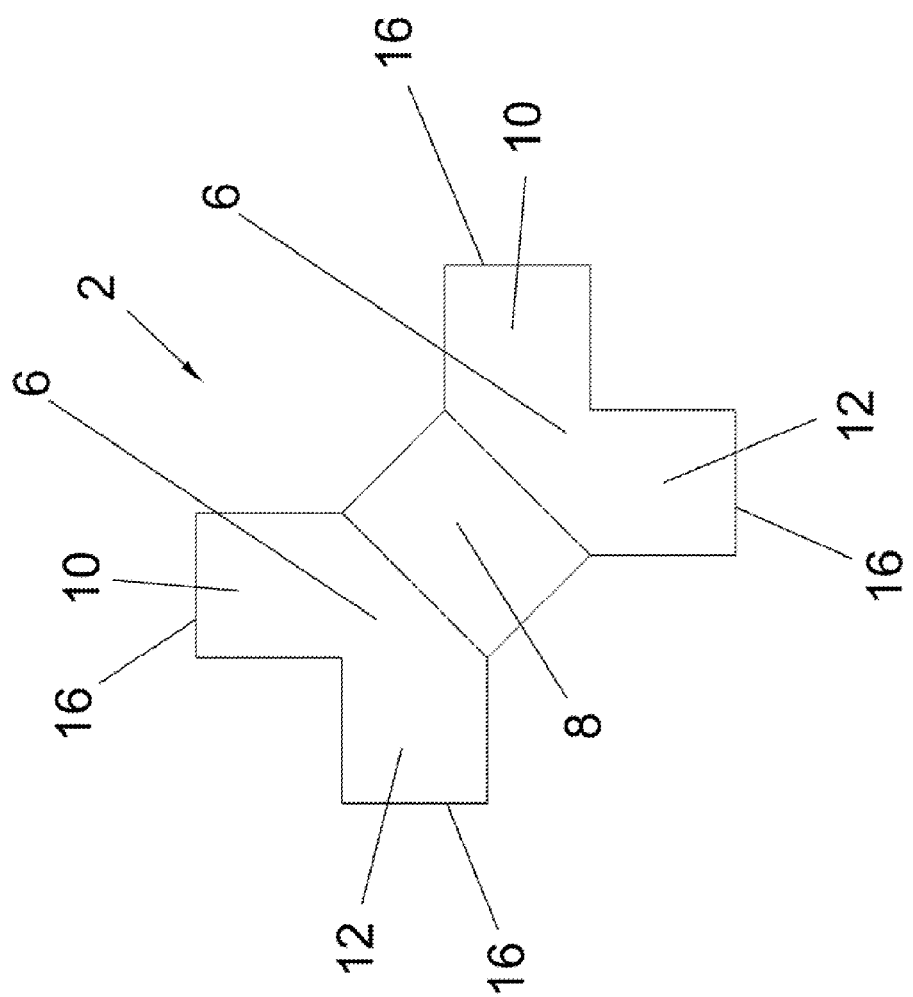
FIG. 4 is a perspective view of one embodiment of a miter coupling.
Figure 5:
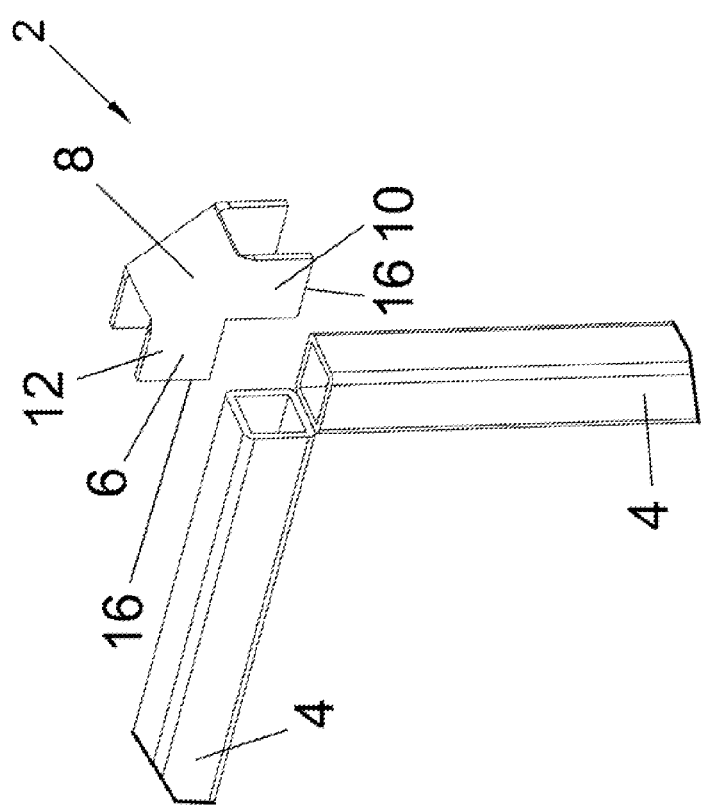
FIG. 5 is an exploded view of one embodiment of a miter coupling with two square metal tubes at a 90 degree angle.
Figure 6:
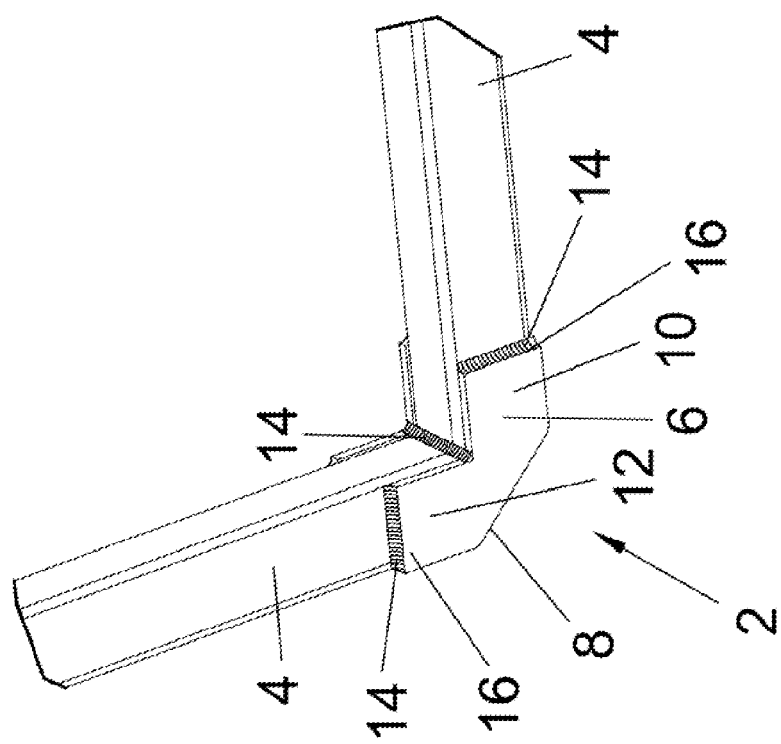
FIG. 6 is a perspective view of one embodiment of a miter coupling joining two square metal tubes at a 90 degree angle.
Figure 7:
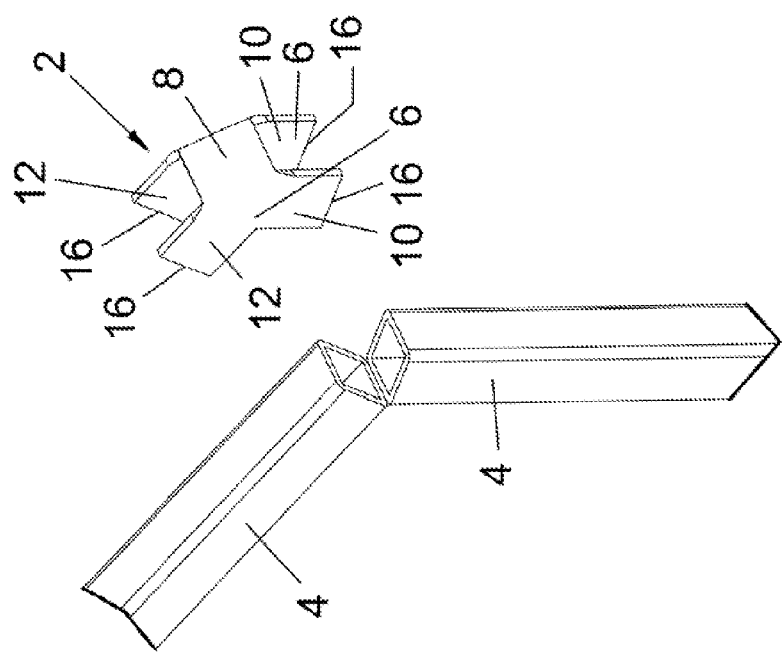
FIG. 7 is an exploded view of one embodiment of a miter coupling with two square metal tubes at an obtuse angle.
Figure 8:
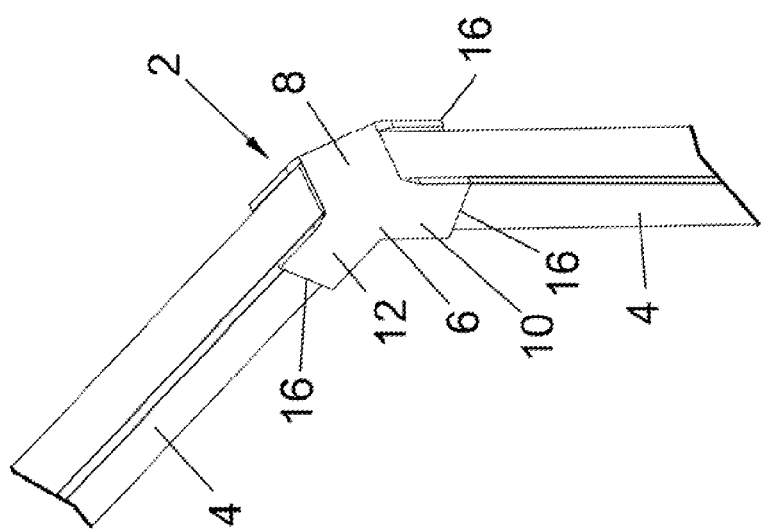
FIG. 8 is a perspective view of one embodiment of a miter coupling joining two square metal tubes at an obtuse angle.

The miter coupling 2 of the present invention, in a preferred embodiment, comprises a single piece of metal formed into a shape that is adapted to receive the ends of two square metal tubes 4 at a desired angle, as shown in FIGS. 4-8. The miter coupling 2 is shaped to form a pair of parallel flat elbow members 6, where the elbow members are formed into a desired angle, and the elbow members are interconnected by a cross support 8. The miter coupling 2 may be manufactured by cutting or stamping a shape from a flat piece of metal, as shown in FIG. 3. Then, the miter coupling 2 may be shaped into the 3-dimensional article shown in FIG. 4, by bending the elbow members 6 at a 90 degree angle with respect to the cross support 8, as shown.

The square metal tubes 4 used in conjunction with the miter coupling 2 have ends that are cut in a transverse, 90 degree direction with respect to the longitudinal direction of the tube.

The elbow members 6 of the miter coupling 2 each have a first section 10 pointing in a first direction, and a second portion 12 pointing in a second direction. Corresponding elbow sections are adapted to receive the end of a square metal tube 4 oriented in the direction specified by that section 10, 12, as shown in FIGS. 5-8. In use, the end of a first square metal tube 4 is positioned within the first section 10 of the elbow members 6, and the end of a second square metal tube 4 is positioned within the second section 12 of the elbow members 6. Welds 14 are placed at the distal ends 16 of the elbow sections 10, 12, in a transverse direction with respect to the longitudinal direction of the square metal tubes 4. Thus, four welds 14 are generated at the distal ends 16 of the elbow sections 10, 12. Additionally, fifth weld 14 may be added to the seam where the square metal tubes 14 contact each other. If necessary for additional strength, other welds may be added at any other seam or contact points between the miter coupling 2 and a square metal tube 4.

The miter coupling 2 and the square metal tubes 4 may be made from any suitable metal, although carbon steel, stainless steel and aluminum are particularly suitable for this application. Additionally, various types of welds and welding techniques may be utilized, including but not limited to MIG (metal inert gas) or TIG (tungsten inert gas) welding.

This arrangement provides a fast, strong, and efficient method for attaching a pair of square metal tubes at any desired angle, which avoids the steps of cutting the tubes at various angles and grinding the welds to form a smooth finish.

Although the present invention has been described in considerable detail with reference to certain preferred versions thereof, other versions are possible. Therefore, the spirit and scope of the appended claims should not be limited to the description of the preferred versions contained herein. All features disclosed in this specification may be replaced by alternative features serving the same, equivalent or similar purpose, unless expressly stated otherwise. Thus, unless expressly stated otherwise, each feature disclosed is one example only of a generic series of equivalent or similar features.

What is claimed is:

1. A miter coupling comprising:
   a square first tube, a longitudinal end of which defines a square first tube edge, wherein inner and outer edges are formed on opposing sides of the first tube edge;
   a square second tube, a longitudinal end of which defines a square second tube edge, wherein inner and outer edges are formed on opposing sides of the second tube edge; and
   a connector formed from a single sheet metal piece, the connector comprising:
   a substantially rectangular cross support forming a central portion of the connector, the cross support comprising opposing left and right edges along a first direction, and further comprising opposing first and second edges along a second direction, perpendicular to the first direction, respectively; and
   left and right elbow members extending from the left and right edges of the cross support, respectively, each elbow member comprising:
   a first section extending obliquely from the respective left or right edge of the cross support, towards the first tube, and terminating in a first outer edge; and
   a second section extending obliquely from the respective left or right edge of the cross support, towards the second tube, and terminating in a second outer edge;
   wherein a joint angle is defined by the angle between the first and second outer edges, and
   wherein the left and right elbow members are bent along the left and right edges of the cross support, respectively, so as to be parallel to and facing one another;
   whereby in an assembled state:
   the inner edges of the first and second tubes are seam-welded together;
   the outer edges of the first and second tubes substantially align with the first and second edges of the cross support, such that an interior of the tubes is not visible and the first and second tubes are separated by the joint angle;
   the first outer edges of left and right elbow members are each seam-welded to opposing sides of the first tube; and
   the second outer edges of the left and right elbow members are each seam-welded to opposing sides of the second tube.

2. The miter coupling set forth in claim 1, wherein said miter coupling is made from a metal selected from the group consisting of carbon steel, stainless steel, and aluminum.

* * * * *